UNITED STATES PATENT OFFICE.

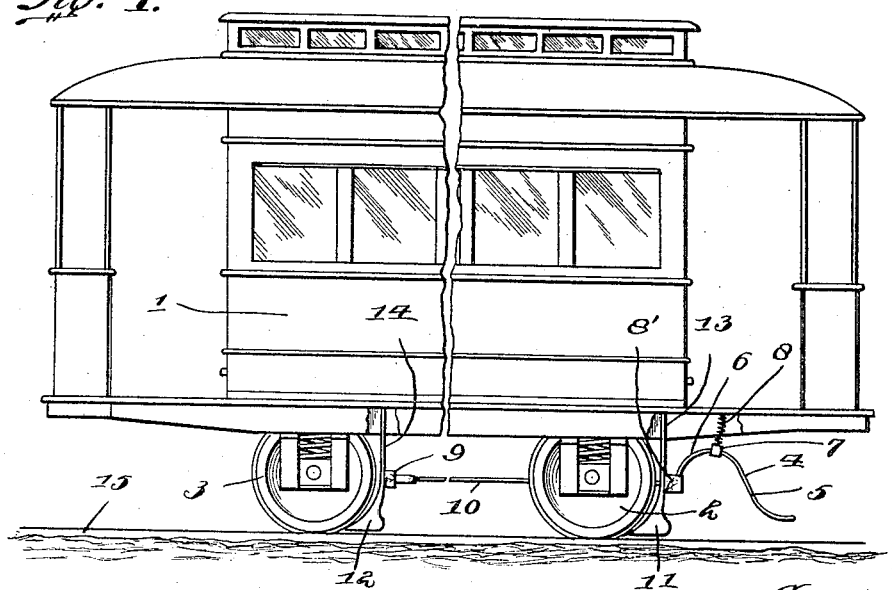
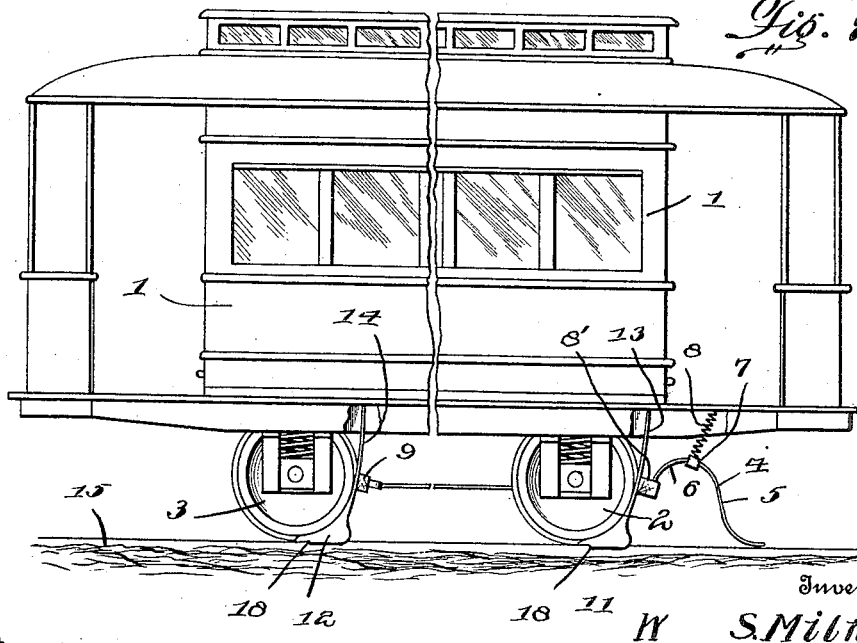

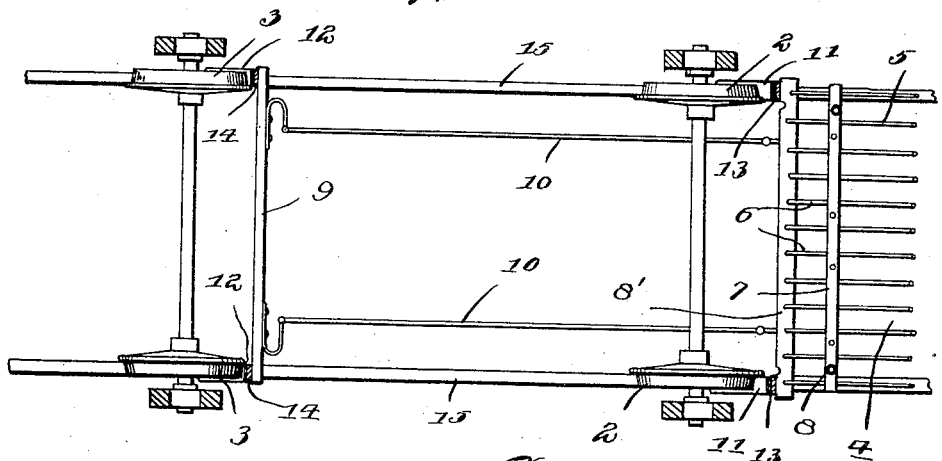

WALTER S. MILNER, OF EASTMAN, GEORGIA.

COMBINED FENDER AND BRAKE.

1,125,865.  Specification of Letters Patent.  Patented Jan. 19, 1915.

Application filed March 25, 1914. Serial No. 827,216.

*To all whom it may concern:*

Be it known that I, WALTER S. MILNER, a citizen of the United States, residing at Eastman, in the county of Dodge and State of Georgia, have invented new and useful Improvements in Combined Fenders and Brakes, of which the following is a specification.

This invention relates to an automatic safety fender and brake for street cars the object of the invention being to provide a combined safety fender and brake mechanism whereby, when the fender strikes a person, vehicle or other object, the brakes will be automatically set into action to bring the car to a quick stop.

A further object of the invention is to provide a novel construction of yielding fender and brake devices whereby a prescribed movement of the fender will first cause the rear brake shoes to be thrown into engagement with the rear wheels before the front brake shoes are thrown into engagement with the front wheels, thereby preventing the car from tilting upward and forward when brought to a quick stop in the use of the invention upon light cars.

A still further object of the invention is to provide a novel construction of brake shoes, which latter are adapted to engage both the wheels of the car and the track rails, to insure a positive and quick stoppage of the car when a person or object is run down by the car and strikes the fender.

The invention consists of the features of construction, combination and arrangement of parts hereinafter fully described and claimed, reference being had to the accompanying drawing, in which:

Figure 1 is a side elevation of a street car embodying my invention, showing the fender and brakes in normal position. Fig. 2 is a similar view showing the fender depressed and the brakes thrown into action. Fig. 3 is a front elevation, showing the fender and adjacent parts of the brake mechanism. Fig. 4 is a sectional plan view of the running gear of the car, the fender and the brake mechanism. Fig. 5 is a perspective view of one of the brake shoes and its supporting hanger. Fig. 6 is a transverse section thereof. Fig. 7 is a bottom plan view of the brake shoe.

Referring to the drawings, 1 designates a street car of any of the ordinary types, and 2 and 3 indicate respectively, the front and rear wheels of the running gear.

The fender 4, which is mounted at the forward end of the car, comprises a series of parallel downwardly and forwardly projecting spring members or tines 5, having downwardly and rearwardly curved arms 6. The tines 5 are all connected at their upper ends by a cross bar or rod 7, which is sustained by suspension springs 8, said springs serving to normally hold the fender supported at the desired elevation above the ground. The arms 6 depend from the rod or bar 7 and are connected with a transverse brake beam 8', whereby when the fender strikes a person, vehicle or other object and is forced downwardly and rearwardly against the resistance of the suspension springs 8, the beam 8' will be forced inwardly by the arms 6 toward the adjacent wheels.

The beam 8' extends across in front of the wheels 2, and a similar beam 9 extends across in front of the wheels 3. These beams are coupled for movement in unison by one or more connecting rods 10. Front and rear sets of brake shoes 11 and 12 are supported from the frame of the running gear by spring hangers 13 and 14 which are fastened to and depend below the beams and coöperate with the springs 8 to normally hold the fender and brake shoes retracted.

The hangers 14 are so disposed and the beams 8' and 9 are so coupled by the rod or rods 10, that the brake shoes 12 are normally held a little closer to the wheels 3 and track rails 15 than the shoes 11 are to the wheels 2 and track rails, whereby the shoes 12, in the operation of the fender and brake mechanism, will be applied just prior to the application of the brake shoes 11, thus checking any tendency of the car when the mechanism is used upon a short or very light car to tilt upwardly and forwardly. Each brake shoe has a curved friction surface 16 to engage the coacting wheel and is provided with a serrated bottom brake surface 17 to engage the adjacent track rail, flanges 18 being provided to engage the opposite sides of the rail and guide the shoe in its movement, thus preventing the shoe from jumping out of position when set and insuring its firm braking engagement with the wheel and rail. By reason of the described construction of the brake shoes, which engage both the wheels and the track rails, the power established by the pressure of the body struck by the fender, will serve not only to depress the fender to a guarding position but will also apply the brake shoes with sufficient force to stop the car. It will be apparent that as the fender members are themselves yielding, and that as the fender is in addition yieldingly supported by the springs 8 and resilient hangers 13 the fender will cushion the impact when a person is struck, thus diminishing liability of injury to such person and breakage of the fender when striking a vehicle or other like object, thus avoiding liability of derangement of the fender and brake mechanism under ordinary conditions of service. The advantages of my combination safety fender and brake mechanism will accordingly be apparent.

Having thus described my invention, I claim:

1. In a combined fender and brake mechanism for street cars, the combination of a fender body comprising a series of parallel downwardly and forwardly projecting spring tines, having downwardly and rearwardly curved spring arms, a bar connecting said tines and arms at their points of junction and extending transversely of the fender body, springs yieldably supporting said bar from the car body, a transverse brake beam carried by the said downwardly and rearwardly curved spring arms, spring hanger strips fixed at their upper ends to the car body and internally secured to the brake beam and extending below said beam, and brake shoes carried by the lower ends of said spring hanger strips to engage the car wheels.

2. In a combined fender and brake mechanism for street cars, the combination of a fender body comprising a series of parallel downwardly and forwardly projecting spring tines, having downwardly and rearwardly curved spring arms, a bar connecting said tines and arms at their points of junction and extending transversely of the fender body, springs yieldingly supporting said bar from the car body, a transverse brake beam carried by the said downwardly and rearwardly curved spring arms, sets of spring hanger strips fixed at their upper ends to the car body and depending therefrom in proximity to the front and rear sets of wheels, the front set of hanger strips being fixed to said brake beam, a second brake beam connecting the other set of hanger strips, brake shoes carried by the lower ends of the hanger strips to respectively engage the front and rear wheels, and connecting means between the brake beams to adapt the same to operate in unison, the rear hanger strips being so disposed with relation to the rear wheels as to cause the brake shoes carried thereby to be engaged with said wheels prior to the engagement of the front wheels by the brake shoes carried by the front hanger strips.

In testimony whereof I affix my signature in presence of two witnesses.

WALTER S. MILNER.

Witnesses:
W. D. PARKERSON,
N. HUGH SMITH.

Copies of this patent may be obtained for five cents each, by addressing the "Commissioner of Patents, Washington, D. C."